(12) United States Patent
Huang

(10) Patent No.: US 11,441,724 B2
(45) Date of Patent: *Sep. 13, 2022

(54) QUICK RELEASE ASSEMBLY AND SUPPORT

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,034

(22) Filed: Feb. 3, 2021

(65) Prior Publication Data

US 2021/0199234 A1  Jul. 1, 2021

Related U.S. Application Data

(63) Continuation-in-part of application No. 16/784,209, filed on Feb. 6, 2020, now Pat. No. 11,118,722.

(60) Provisional application No. 63/050,119, filed on Jul. 10, 2020, provisional application No. 62/861,300, filed on Jun. 13, 2019.

(30) Foreign Application Priority Data

Nov. 11, 2019 (TW) .................................. 108214926
Oct. 7, 2020 (TW) .................................. 109134730

(51) Int. Cl.
*F16M 11/04* (2006.01)

(52) U.S. Cl.
CPC ................................ *F16M 11/041* (2013.01)

(58) Field of Classification Search
CPC ............ F16M 11/041; F16M 2200/066; A47B 2097/005
See application file for complete search history.

(56) References Cited

U.S. PATENT DOCUMENTS 7,317,613 B2 * 1/2008 Quijano ............. F16M 11/2021
361/679.41
7,441,739 B2 * 10/2008 Huang ................... F16M 13/02
248/292.14

(Continued)

FOREIGN PATENT DOCUMENTS

CN 201191335 2/2009
CN 206608720 11/2017

(Continued)

OTHER PUBLICATIONS

"Office Action of Taiwan Counterpart Application", dated Jan. 29, 2021, p. 1-p. 5.

*Primary Examiner* — Bradley Duckworth
(74) *Attorney, Agent, or Firm* — JCIPRNET

(57) ABSTRACT

A quick release assembly and a support are provided. The quick release assembly is used to attach an object onto the support. The quick release assembly includes a first quick release unit and a second quick release unit. The first quick release unit includes a first main body, an operating element and a driven-stop plate. The operating element is assembled on the first main body, and the driven-stop plate is arranged in the first main body and is driven by the operating member. The second quick release unit includes a second main body used to engage with the first main body. An engagement between the first main body and the second main body is released by applying an external force to the operating element for driving the driven-stop plate to move, so as to disassemble the object from the support.

18 Claims, 13 Drawing Sheets

(56) References Cited

U.S. PATENT DOCUMENTS

| | | | | |
|---|---|---|---|---|
| 7,499,272 B2* | 3/2009 | Searby | ............... | F16M 11/041 248/917 |
| 7,502,226 B2* | 3/2009 | Searby | ............... | F16M 11/041 361/679.41 |
| 7,669,820 B2* | 3/2010 | Tien | ............... | F16M 11/10 248/222.13 |
| 8,083,193 B2* | 12/2011 | Matsui | ............... | F16M 11/041 248/221.11 |
| 8,690,111 B2* | 4/2014 | Huang | ............... | F16M 13/02 248/276.1 |
| 8,733,716 B2* | 5/2014 | Li | ............... | G06F 1/1601 248/188 |
| 9,042,092 B2* | 5/2015 | Lu | ............... | F16M 11/041 361/679.29 |
| 9,338,902 B2* | 5/2016 | Liu | ............... | F16M 11/041 |
| 10,309,578 B2* | 6/2019 | Yen | ............... | F16M 13/022 |
| 10,659,719 B2* | 5/2020 | Huang | ............... | F16M 11/041 |
| 10,809,761 B1* | 10/2020 | Lin | ............... | F16M 11/10 |
| 11,118,722 B2* | 9/2021 | Huang | ............... | A47B 97/00 |
| 2006/0076463 A1* | 4/2006 | Drew | ............... | F16M 11/105 248/121 |
| 2006/0231667 A1* | 10/2006 | Tsuo | ............... | F16M 11/041 242/384.5 |
| 2008/0251658 A1 | 10/2008 | Chin et al. | | |
| 2012/0267491 A1* | 10/2012 | Chiu | ............... | F16M 13/00 248/221.11 |
| 2013/0044411 A1* | 2/2013 | Zhen | ............... | F16M 11/22 361/679.01 |
| 2015/0050077 A1* | 2/2015 | Huang | ............... | F16M 11/041 403/322.1 |

FOREIGN PATENT DOCUMENTS

| | | |
|---|---|---|
| DE | 202020103327 | 6/2020 |
| JP | 2012222348 | 11/2012 |
| TW | M439830 | 10/2012 |
| TW | M467100 | 12/2013 |

\* cited by examiner

QUICK RELEASE ASSEMBLY AND SUPPORT

CROSS-REFERENCE TO RELATED APPLICATION

This application is a continuation-in-part application of U.S. application Ser. No. 16/784,209, filed on Feb. 6, 2020, now pending, which claims the priority benefit of U.S. provisional application Ser. No. 62/861,300, filed on Jun. 13, 2019, and Taiwan application serial no. 108214926, filed on Nov. 11, 2019. This application also claims the priority benefit of U.S. provisional application Ser. No. 63/050,119, filed on Jul. 10, 2020, and Taiwan application serial no. 109134730, filed on Oct. 7, 2020. The entirety of each of the above-mentioned patent applications is hereby incorporated by reference herein and made a part of this specification.

BACKGROUND OF THE INVENTION

Technical Field

The present invention relates to a quick release assembly, and particularly relates to a quick release assembly and a support using the quick release assembly.

Description of Related Art

Supports are usually needed for many objects which are not able to stand firmly by themselves, or which need to be supported for some special reasons when viewing or using. For example, liquid crystal display screens (LCD) are usually set on the screen stands for viewing. Or for another example, bicycles are often set on the holders for showing off. Objects like above mentioned LCDs or bicycles are often disassembled from the stands or holders for cleaning, re-insertion, trial (bicycle trial riding) or replacing of the showing-off position. Therefore, a quick disassemble way for disassembling is need.

Taking the LCD display screen as an example, Pat. No. TWM439830 discloses a display with a quick release function, which includes a display panel having a first engaging portion and a first inserting portion, a support, and a joint mechanism having a second engaging portion and a second inserting portion, so that the display panel can be quickly assembled to the support or quickly detached from the support. However, since the back of the housing of this type of display panel is provided with a specific structure (such as the first engaging portion, the first inserting portion and a specific size of accommodating space, that is to say, part of the quick release unit has been integrally formed on the back of the housing), these configuration are complicated and cannot be regulated by international agreements, unlike the VESA (Video Electronics Standards Association) hole sizes. Therefore, a display panel of one model can only be matched with support with a specific specification, resulting in low production compatibility, which means that it is usually impossible to apply only one specified support with one specification for display panels of various sizes and weights. The problem results in highly development and manufacturing costs.

SUMMARY OF THE INVENTION

The disclosure provides a quick release assembly that can quickly assemble an object onto a support or disassemble the object from the support, and the quick release assembly is applied to a variety of objects.

The present invention provides a support using the aforementioned quick release assembly.

A quick release assembly for attaching an object to a stand is provided. The quick release assembly includes a first quick release unit and a second quick release unit. The first quick release unit detachably disposed on one of the stand and the object, and the first quick release unit includes a first main body, an operating element, and a driven-stop plate. The operating element is assembled on the first main body, wherein a portion of the operating element is exposed outside of the first main body. The driven-stop plate is arranged in the first main body and linked to the operating element. The driven-stop plate has a body portion, an elastic portion and at least a first hook. The second quick release unit is suitable for engaging with the first quick release unit detachably. The second quick release unit includes a second main body, wherein the second main body is detachably disposed on the other one of the stand and the object. The second main body has at least a first conjunction, and a position of the first conjunction is corresponding to a position of the first hook. The first hook is engaged with the first conjunction correspondingly to attach the object onto the stand when the first quick release unit and the second quick release unit are engaged with each other. The operating element drives the driven-stop plate to move when an external force is applied on the operating element, the first hook is separated from the first conjunction, and thereby enabling the first quick release unit being separated from the second quick release unit.

In an embodiment of the invention, the second main body further has a recessed space, and the first main body is accommodated in the recessed space when the first quick release unit and the second quick release unit are engaged with each other.

In an embodiment of the invention, the second quick release unit further comprises at least a set of fixing members, the second main body further comprises at least a set of attachment holes, and the fixing members are inserted into the attachment holes correspondingly to lock into the object, thereby fixing the second main body to the object.

In an embodiment of the invention, the attachment holes comply with VESA specifications, the object is a display screen, and the object has at least a set of mounting holes corresponding to the mounting holes.

In an embodiment of the invention, the number of the elastic portion, the number of the first hook, or the number of the first conjunction are two, and the elastic portions and the first hooks are respectively located on opposite sides of the body portion.

In an embodiment of the invention, wherein the operating element is a knob having a cam portion corresponding to an opening of the body portion of the driven-stop plate.

In an embodiment of the invention, the cam portion has a first inclined plane, the opening has a second inclined plane, and the first inclined plane and the second inclined plane are in contact with each other.

In an embodiment of the invention, the elastic portion is an elastic sheet extended from the body portion.

In an embodiment of the invention, the elastic portion is a spring disposed on the body portion.

In an embodiment of the invention, the first main body includes a first cover and a second cover, and the driven-stop plate is disposed between the first cover and the second cover.

In an embodiment of the invention, the body portion of the driven-stop plate has a pair of sliding grooves located on opposite sides of the operating element, and the first cover or the second cover has a pair of first ribs, the first ribs are located in the sliding grooves correspondingly to move along an extending direction of the sliding grooves.

In an embodiment of the invention, the second cover has a pair of second hooks, the second main body has a pair of second conjunctions, and positions of the second hooks corresponds are corresponding to positions of the second conjunctions.

A support for supporting an object is provided. The support comprising: a stand and a quick release assembly according to any one of claims 1 to 12, wherein the first quick release unit of the quick release assembly is assembled on one of the stand and the object, and the second quick release unit of the quick release assembly is assembled on the other one of the stand and the object, and the second quick release unit is suitable for engaging with the first quick release unit detachably.

Based on the foregoing, through the use of the quick release assembly, the operating element drives the driven-stop plate to move by applying external force on the operating element, so as to detach the first quick release unit from the second quick release unit, and therefore the object assembled on the support is disassembled from the support quickly and conveniently.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The present invention provides a quick release assembly and a support using the quick release assembly. The quick release assembly has at least a set of attachment holes, such as VESA (Video Electronics Standards Association) holes. On the other hand, multiple objects of different types, specifications, and/or models are each equipped with mounting holes, wherein positions of the mounting holes (such as VESA holes) of each object will correspond to positions of one set of the attachment holes of the quick release assembly. Therefore, the mounting holes of different objects are screwed with the corresponding attachment holes of the quick release assembly to assemble the object on the support through more than one set of attachment holes of the quick release assembly.

Furthermore, the quick release assembly has functions of easy to assemble and to disassemble, so it is convenient for users to quickly and easily assemble the object on the support or disassemble the object from the support.

The following will describe the quick release assembly and support of the present invention. The description about the positions or orientations such as above, under, left, right, front, back or along a direction is based on the relative positions of the components shown in the figure, and ordinary knowledged people should be able to know that the description of the positions or orientations will change when the reference point used to describe the relative positions or orientations is different, so the description of the position or orientations cannot be used to limit the relationship of the components.

First Embodiment

Figure 1:
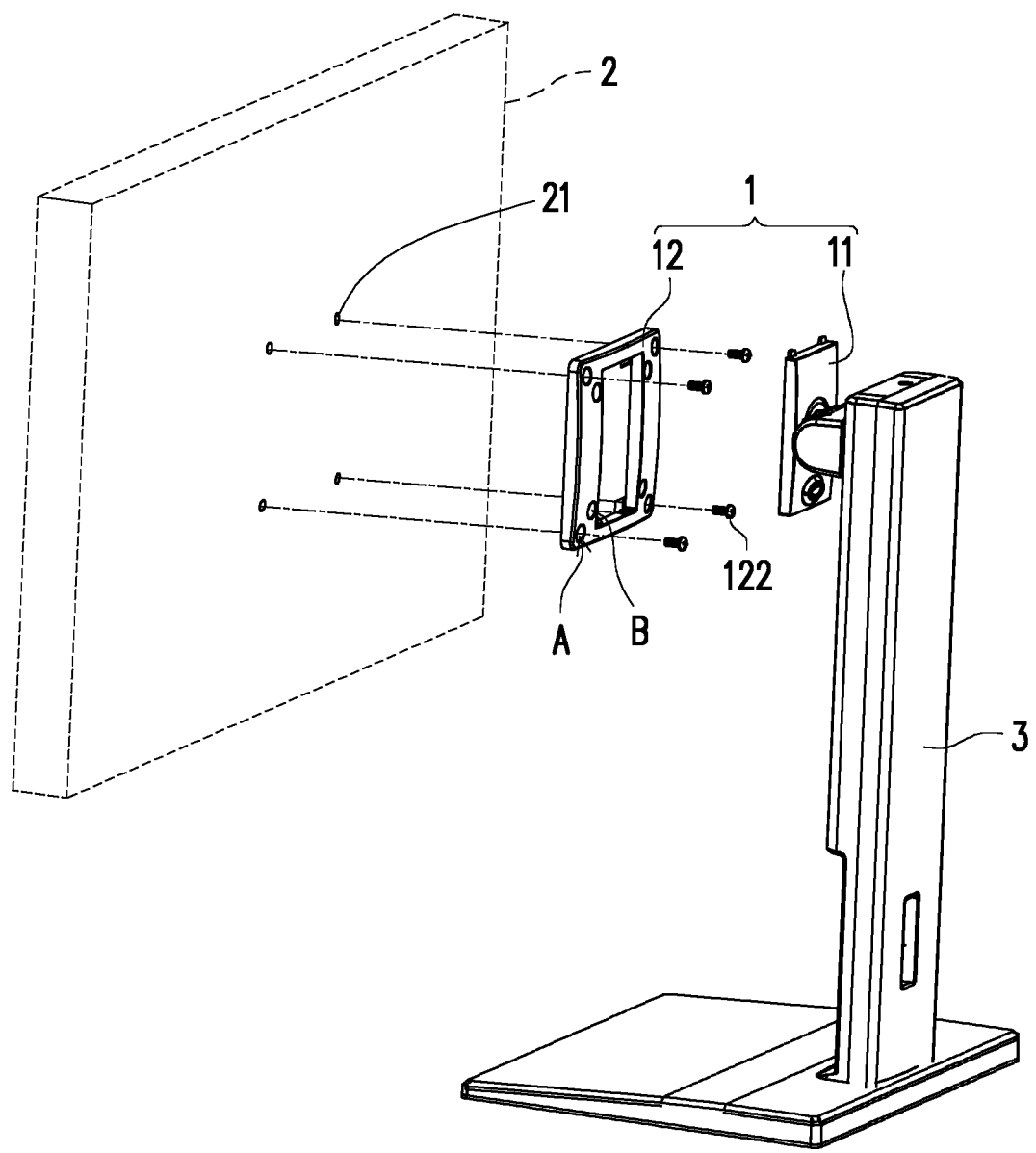
FIG. 1 is a schematic view of the object, the quick release assembly and the support.
Figure 2A:
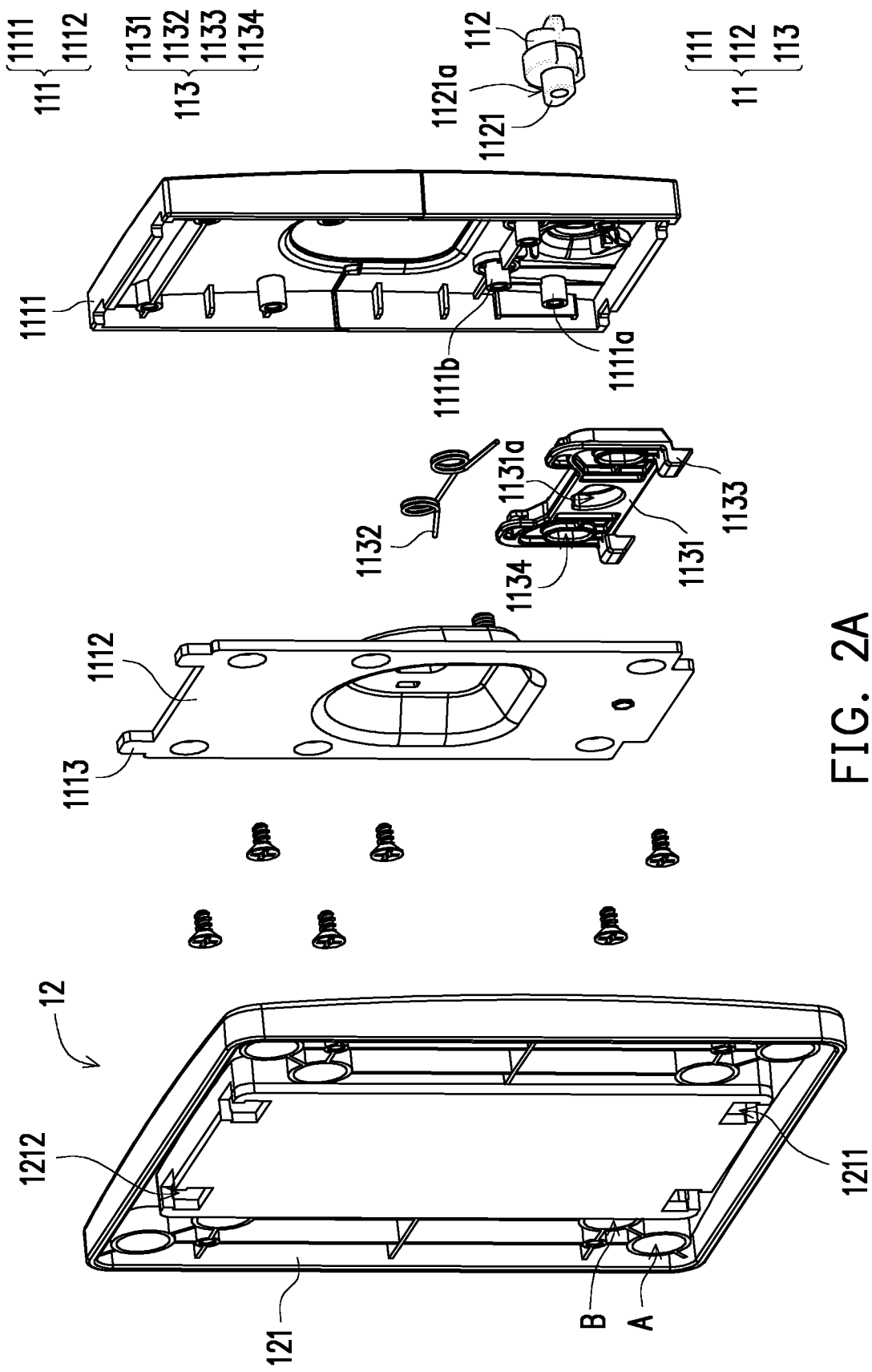
FIG. 2A is an exploded schematic view of the quick release assembly.
Figure 2B:
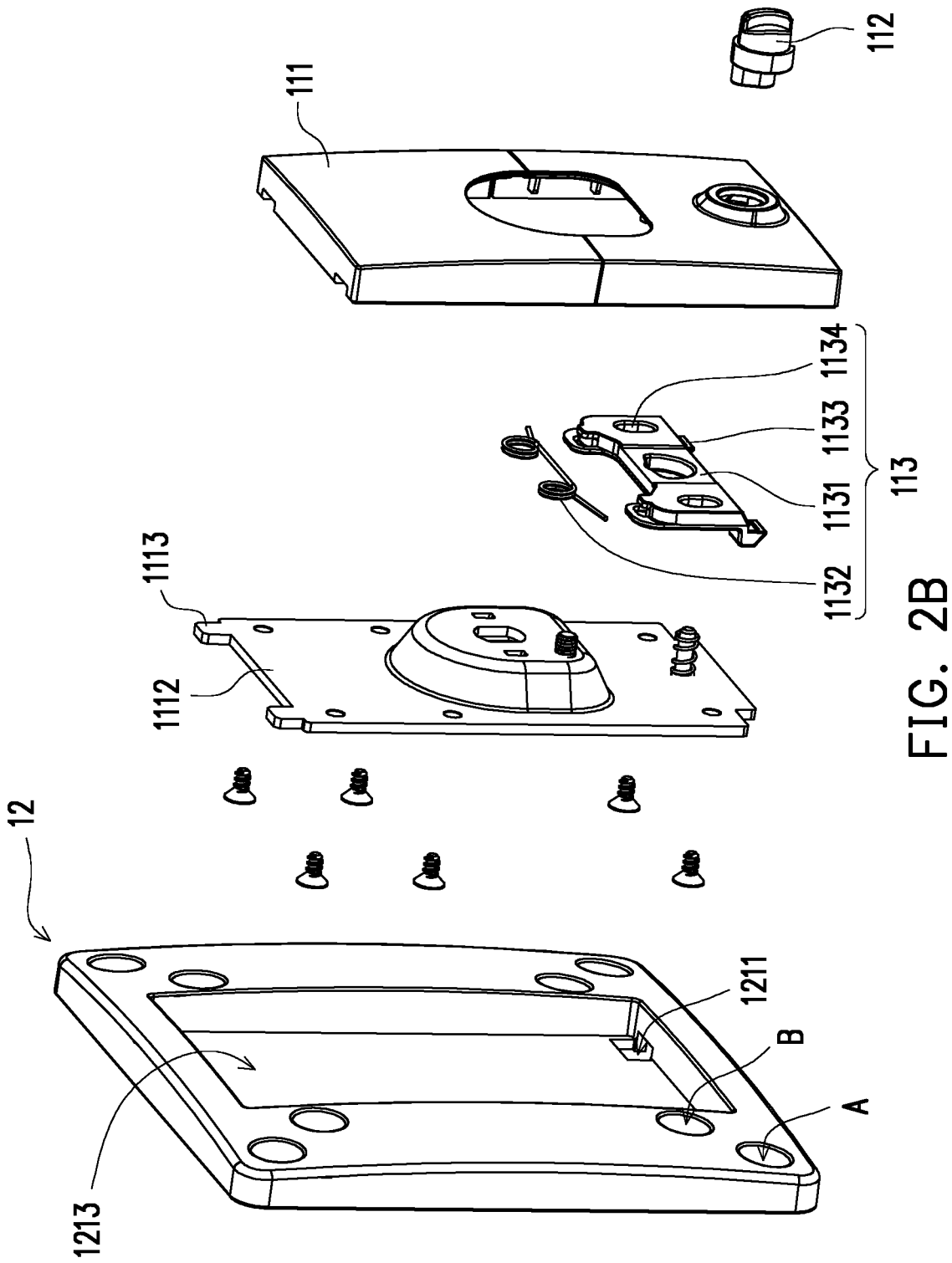
FIG. 2B is a schematic view of FIG. 2A from another perspective.

FIG. 1 is a schematic view of the object, the quick release assembly and the support, FIG. 2A is an exploded schematic view of the quick release assembly, and FIG. 2B is a schematic view of FIG. 2A from another perspective. Referring to FIG. 1 and FIG. 2A at the same time. The quick release assembly 1 is used to attach an object 2 to a support 3. The object 2 in the present embodiment is an electronic device, such as a liquid crystal display screen, but is not limited thereto. The object 2 may also be a non-electronic device, such as a bicycle.

The quick release assembly 1 includes a first quick release unit 11 and a second quick release unit 12. One of the first quick release unit 11 and the second quick release unit 12 is assembled on the support 3, and the other one of the first quick release unit 11 and the second quick release unit 12 is attached to the object 2. In the present embodiment, the first quick release unit 11 is assembled on the support 3, and the second quick release unit 12 is attached to the object 2.

The above-mentioned first quick release unit 11 may be assembled with the support 3 by screwing, and the second quick release unit 12 may also be assembled with the object 2 by screwing. The following will explain in detail. The method of screwing is only used for explaining the present embodiment, but not for limiting. In the case that the structural strength and the fitting degree matching with each other, the method of assembling the first quick release unit 11 to the support 3 and assembling the second quick release unit 12 to the object 2 may also achieve in other ways.

In view of the above, the first quick release unit 11 includes a first main body 111, an operating element 112 and a driven-stop plate 113. The first main body 111 of the present embodiment includes a first cover 1111 and a second cover 1112, and the operating element 112 is assembled to the first main body 111 while a portion of the operating element 112 is exposed outside the first main body 111 for the user to operate conveniently.

The driven-stop plate 113 is disposed in the first main body 111 and linked to the operating element 112. Precisely speaking, the driven-stop plate 113 is disposed between the first cover 1111 and the second cover 1112.

Figure 3:
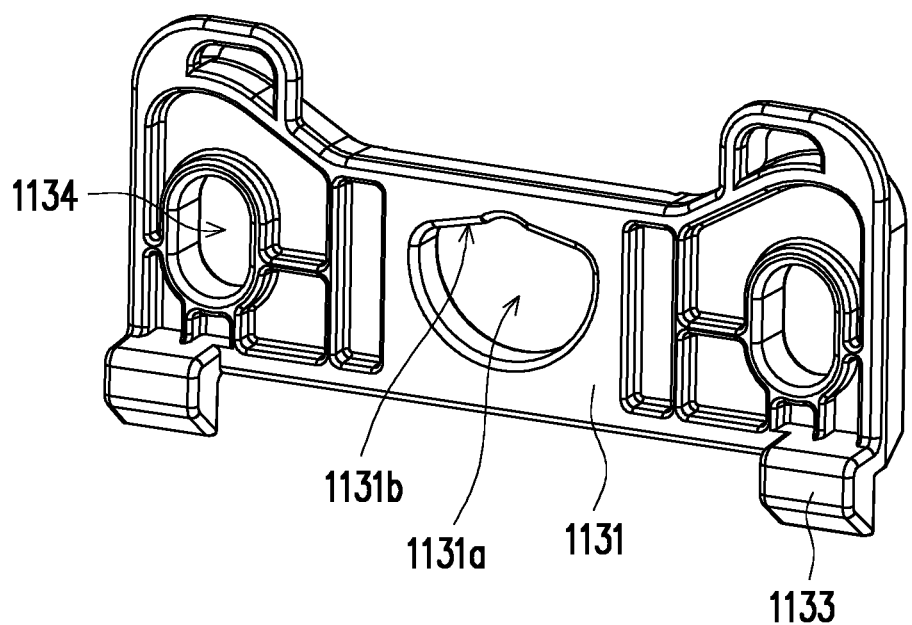
FIG. 3 is a schematic view of the driven-stop plate.

FIG. 3 is a schematic view of the driven-stop plate. Referring to FIGS. 2A, 2B and 3 at the same time, the driven-stop plate 113 has a body portion 1131, an elastic portion 1132 and a pair of first hooks 1133. The elastic portion 1132 and the first hooks 1133 are located on opposite sides of the body portion 1131. Specifically, the elastic portion 1132 is located on the top of the body portion 1131, and the first hooks 1133 are located at the bottom of the body portion 1131.

In the present embodiment, the body portion 1131 of the driven-stop plate 113 has an opening 1131a to accommodate the operating element 112, and the operating element 112 passes through the first cover 1111 to be assembled to the driven-stop plate 113. In addition, the elastic portion 1132 is a spring that is an element separated of the body portion 1131, where the spring is a torsion spring. The spring is disposed on the body portion 1131 and engaged in the first main body 111. The elastic portion 1132 embodied as the spring can be symmetrically set to two; or, it can also be embodied as a spring with a symmetrical structure, which can be selected according to actual requirements. In the present embodiment, the spring used as the elastic portion 1132 is a spring with a symmetrical structure.

The driven-stop plate 113 further has a pair of sliding grooves 1134, and the sliding grooves 1134 are located on the left and right sides of the opening 1131a. The first cover 1111 of the present embodiment has a pair of first ribs 1111a, and the first ribs 1111a are located in the sliding grooves 1134 correspondingly, so as to move in the sliding grooves 1134 along an extending direction of the sliding grooves 1134. A pair of the second ribs 1111b is arranged above the first ribs 1111a, and the above-mentioned spring (torsion spring) is sleeved on the second ribs 1111b with two ends abut against the body portion 1131. Therefore, the spring (torsion spring) exerts force on the body portion 1131.

Figure 4C:
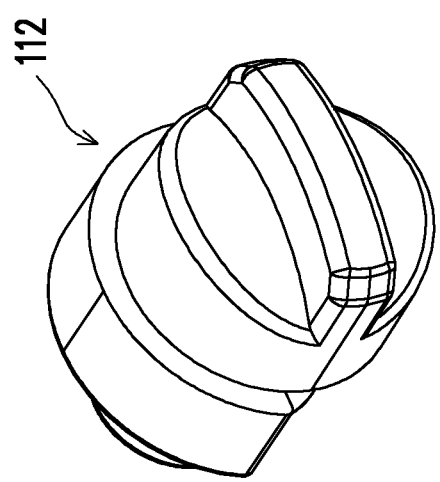
FIG. 4A to FIG. 4C are schematic views of the operating element from different view angles.
Figure 4B:
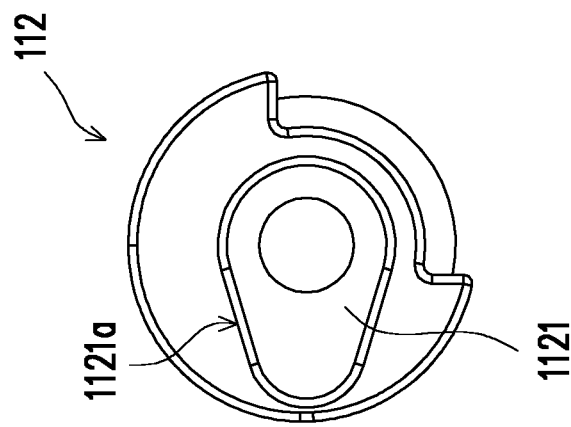
Figure 4A:
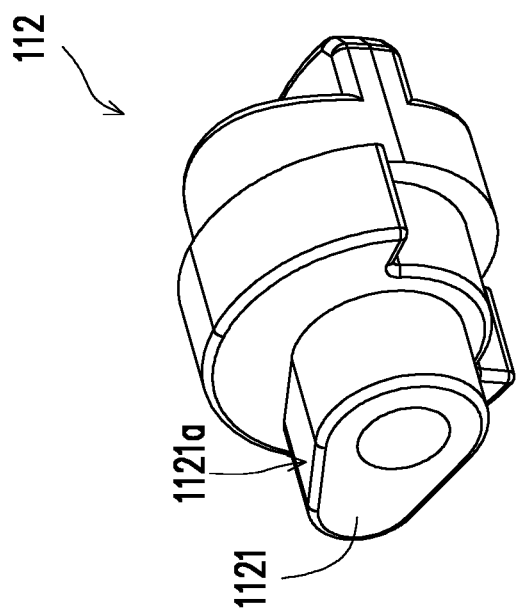

FIG. 4A to FIG. 4C are schematic views of the operating element from different view angles. Please refer to FIG. 3 and FIG. 4A to FIG. 4C at the same time. The above operating element 112 is embodied as a knob, and the operating element 112 has a cam portion 1121 corresponding to the opening 1131a. In addition, the cam portion 1121 has a first inclined plane 1121a, and the opening 1131a has a second inclined plane 1131b, wherein the first inclined plane 1121a and the second inclined plane 1131b are in contact with each other. The conformal of the shape of the first inclined plane 1121a and the second inclined plane 1131b results in a guidance between the first inclined plane 1121a and the second inclined plane 1131b. A rotation of the operating element 112 drives the driven-stop plate 113 to move linearly when the user applies force to turn the knob.

Please refer to FIG. 1, FIG. 2A and FIG. 2B, the second quick release unit 12 includes a second main body 121 that is assembled to the object 2. The second main body 121 has a pair of first conjunctions 1211, wherein the setting positions of the first conjunctions 1211 are corresponding to the setting positions of the first hooks 1133. The above-mentioned second cover 1112 has a pair of second hooks 1113, and the second main body 121 has a pair of second conjunctions 1212, wherein the setting positions of the second hooks 1113 are corresponding to the setting positions of the second conjunctions 1212, so the second cover 1112 may engage with the second main body 121.

Please refer to FIG. 1 and FIG. 2A. When assembling the object 2 onto the support 3, the first quick release unit 11 of the quick release assembly 1 is assembled onto the support 3 firstly, and then the second quick release unit 12 is assembled onto the object 2.

Specifically, the second main body 121 of the second quick release unit 12 of the present embodiment has two sets of attachment holes A and B, and positions of the two sets of attachment holes A and B are different. The above mentioned object 2 has a set of mounting holes 21. The second quick release unit 12 further includes at least one fixing member 122, and the fixing member 122 is a screw. The second quick release unit 12 is attached to the object 2 by passing the fixing member 122 through one of the two sets of the attachment holes A and B of the second main body 121, wherein a configuration of one set of the attachment holes A or B is corresponding to a configuration of the mounting holes 21 of the object 2, and by screwing the fixing member 122 into the mounting holes 21. The above-mentioned configuration includes a position and a diameter of a hole.

Incidentally, the object 2 in the present embodiment is a display screen, and the configurations of the attachment holes A and B meet the specifications specified by VESA. Because all display screens have VESA holes (in compliance with VESA regulations), the quick release assembly 1 is suitable for being applied to the display screen, and the display screen is adaptable for the support 3 regardless of the size or model of the display screen.

Then, engaging the first quick release unit 11 and the second quick release unit 12 to each other. Specifically, the second hooks 1113 are inserted in the second conjunctions 1212 of the second main body 121, and the first hooks 1133 of the driven-stop plate 113 are inserted into the first conjunctions 1211 of the second main body 121, so that the first quick release unit 11 and the second quick release unit 12 are engaged and assembled together. The object 2 is attached to the support 3.

Incidentally, as shown in FIG. 2B, the second main body 121 also has a recessed space 1213. The first main body 11 is accommodated in the recessed space 1213 when the first quick release unit 11 and the second quick release unit 12 are engaged with each other. By the configuration of the recessed space 1213, the overall thickness of the quick release assembly 1 after the first main body 11 and second main body 12 being engaged is reduced.

Figure 5A:
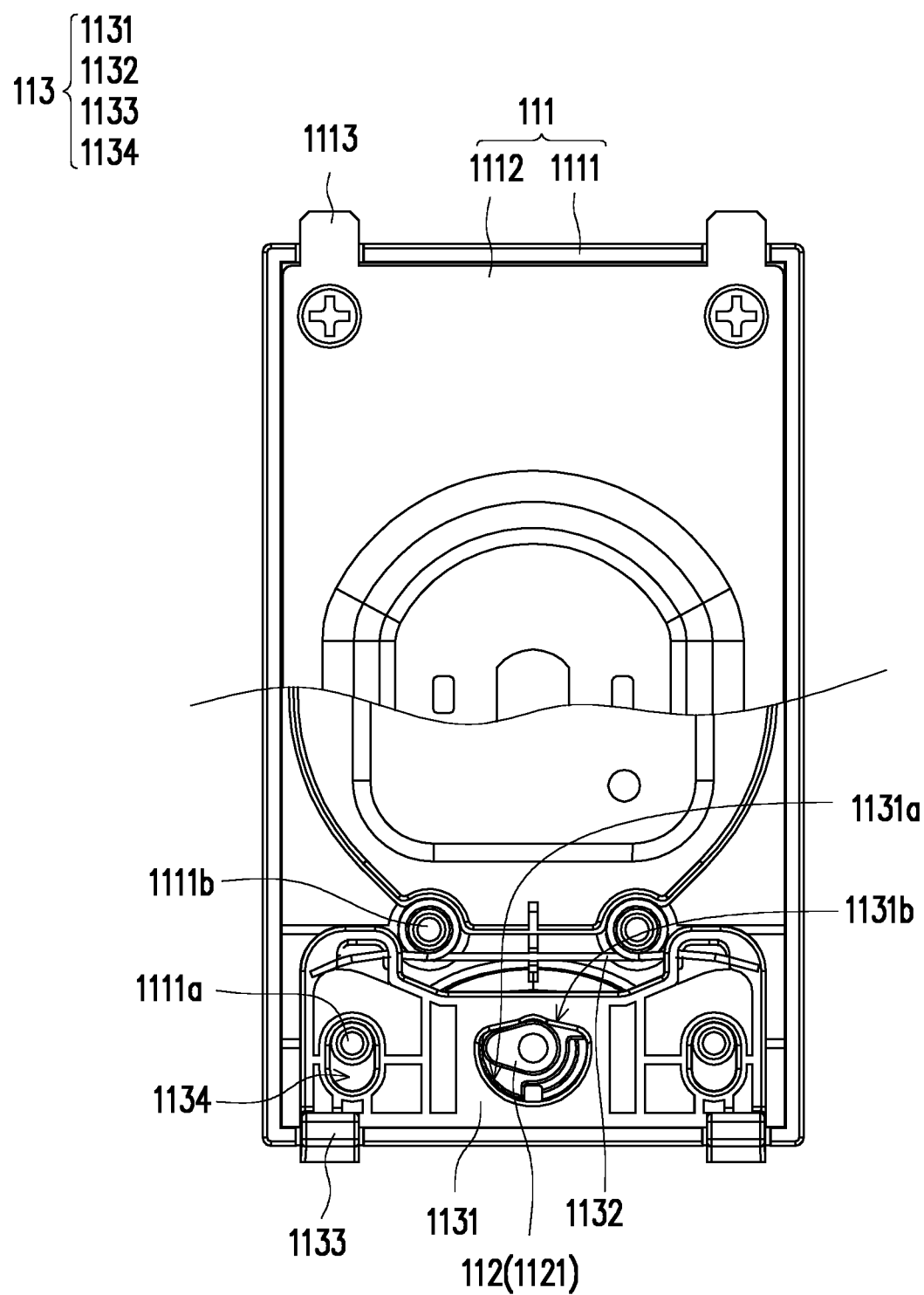
FIG. 5A to FIG. 5C are schematic views of applying external force to the operating element, and the operating element drives the driven-stop plate to move linearly relative to the first main body.
Figure 5B:
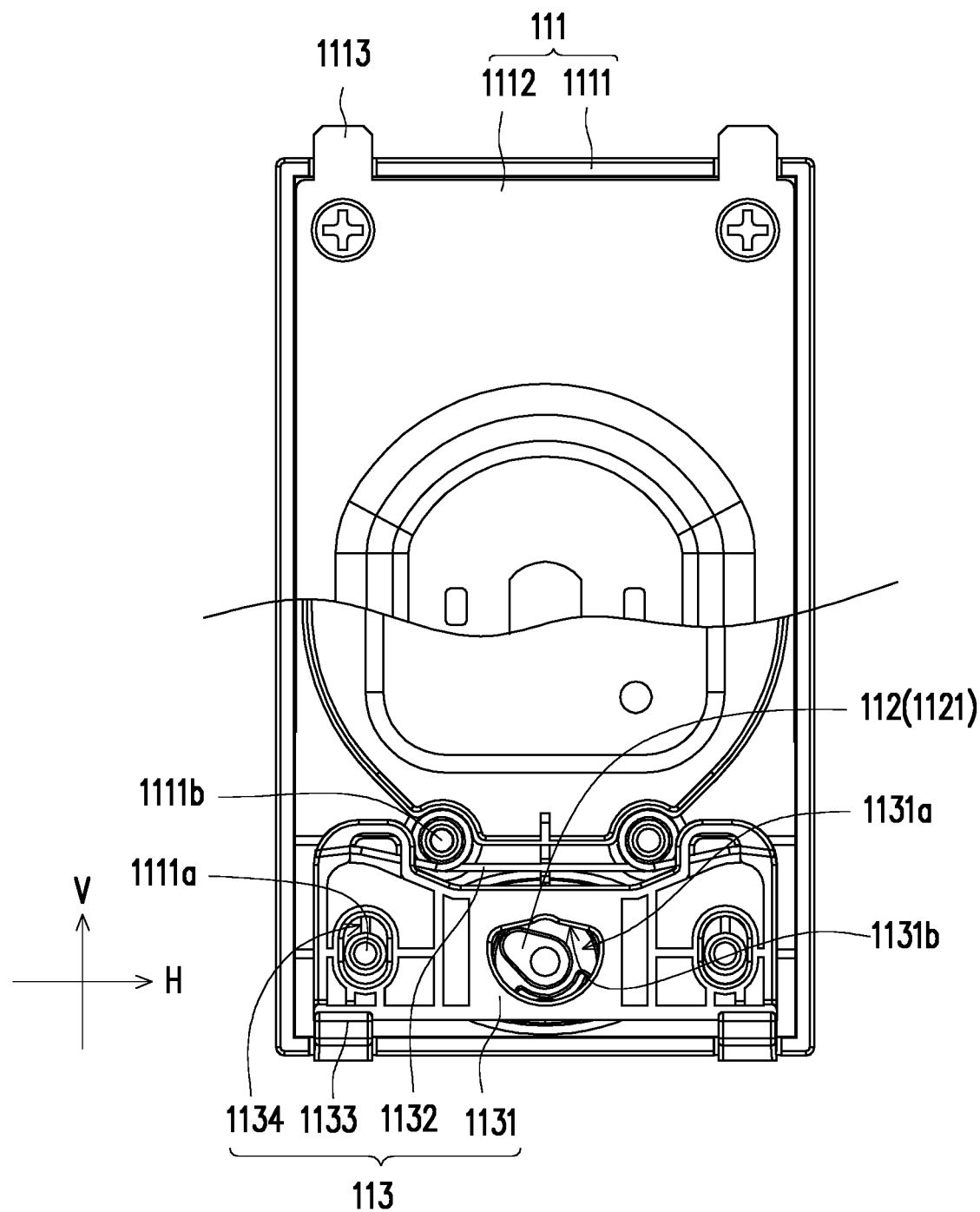
Figure 5C:
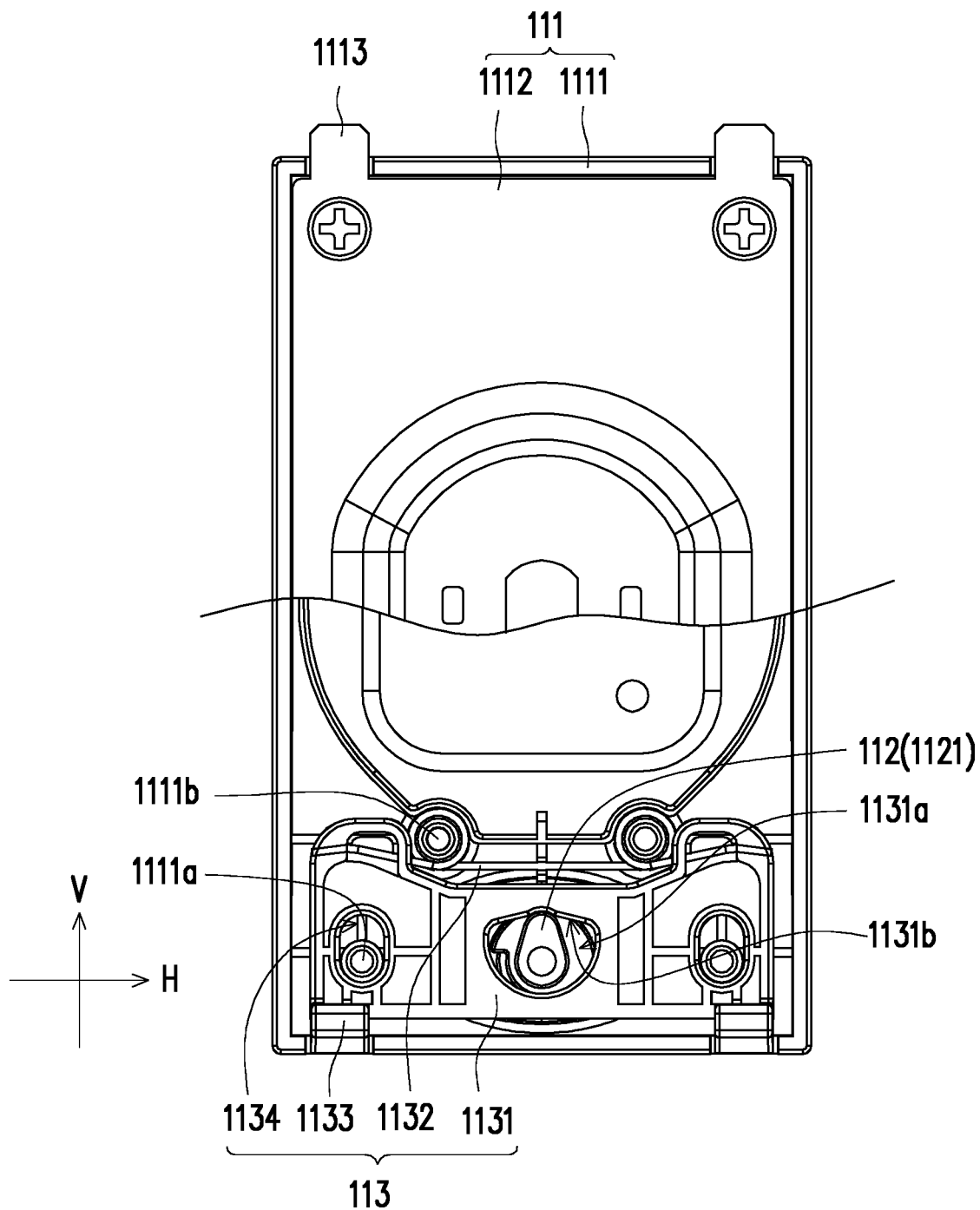

FIG. 5A to FIG. 5C are schematic views of applying external force to the operating element, and the operating element drives the driven-stop plate to move linearly relative to the first main body.

Please refer to FIG. 5A, the tip of the cam portion 1121 of the operating element 112 faces the left in the figure when the object 2 is attached to the support 3, and the first ribs 1111a are located on the upper edge of the sliding grooves 1134.

As shown in FIG. 5B, an external force is applied to the operating element 112 when removing the object 2 from the support 3. Applying the external force to the operating element 112 to rotate the operating element 112 clockwise with a simple gesture since the operating element 112 in the present embodiment is embodied as a knob.

The tip of the cam portion 1121 of the operating element 112 rotates to the right while the operating element 112 rotates clockwise; and since the first inclined plane 1121a of the cam portion 1121 contacts the second inclined plane 1131b of the opening 1131a of the body portion 1131, the second inclined plane 1131b moves along with the first inclined plane 1121a. The body portion 1131 is driven by the operating element 112 to move. It is worth noting that the first ribs 1111a are located in the sliding grooves 1134, wherein the sliding grooves 1134 are extending in the vertical direction V, so the driven-stop plate 113 moves linearly upward along the vertical direction V only. The driven-stop plate 113 cannot move in a horizontal direction H, nor rotate.

The elastic portion 1132 embodied as the spring is compressed and stores an elastic restoring force as the driven-stop plate 113 moves upward.

Please refer to FIG. 2A and FIG. 5C at the same time. When the operating element 112 is rotated about 90 degrees, the tip of the cam portion 1121 faces upwards. At this time, the driven-stop plate 113 moves to a relatively high position, the first ribs 1111a are located at the lower edge of the sliding grooves 1134, the first hooks 1133 of the driven-stop plate 113 is then separated from the first conjunctions 1211 of the second main body 121, and therefore initially disengage the first quick release unit 11 from the second quick release unit 12. In addition, removing the second hooks 1113 from the second conjunctions 1212 makes the second quick release unit 12 completely separate from the first quick release unit 11, and then the object 2 is easily detached from the support 3.

Incidentally, after removing the force applied to the operating element 112, the elastic restoring force of the spring is applied to the body portion 1131, and thereby restoring the driven-stop plate 113 to its original position.

Conversely, when assembling the first quick release unit 11 to the second quick release unit 12, insert the second hooks 1113 into the second conjunctions 1212, and insert the first hooks 1133 into the first conjunctions 1211, and then the first quick release unit 11 is assembled to the second quick release unit 12.

It can be seen from the above that the first quick release unit 11 and the second quick release unit 12 of the quick release assembly 1 are assembled and disassembled quickly and easily, which is convenient for users.

In addition, the second main body 121 of the second quick release unit 12 is provided with at least one set of attachment holes (preferably multiple sets, and two sets of attachment holes A and B are shown in the present embodiment for example), and the configurations of the attachment holes A and B correspond to the configurations of the mounting holes 21 in different objects 2. Therefore, in order to set up the object 2 onto the support 3, users only need to have one set of quick release assembly 1 for standing by, instead of purchasing corresponding components with specific specifications if the object 2 having different specifications and/or sizes.

Second Embodiment

The present embodiment is similar to the aforementioned first embodiment. The difference between the first embodiment and the present embodiment is that the first main body 111A includes only the first cover 1111' but does not include the second cover 1112, and that the elastic portion 1132A of the driven-stop plate 113A is embodied as elastic sheet which is a portion extended from the body portion 1131, instead of a spring that is a separated element from the body portion 1131.

Figure 6:
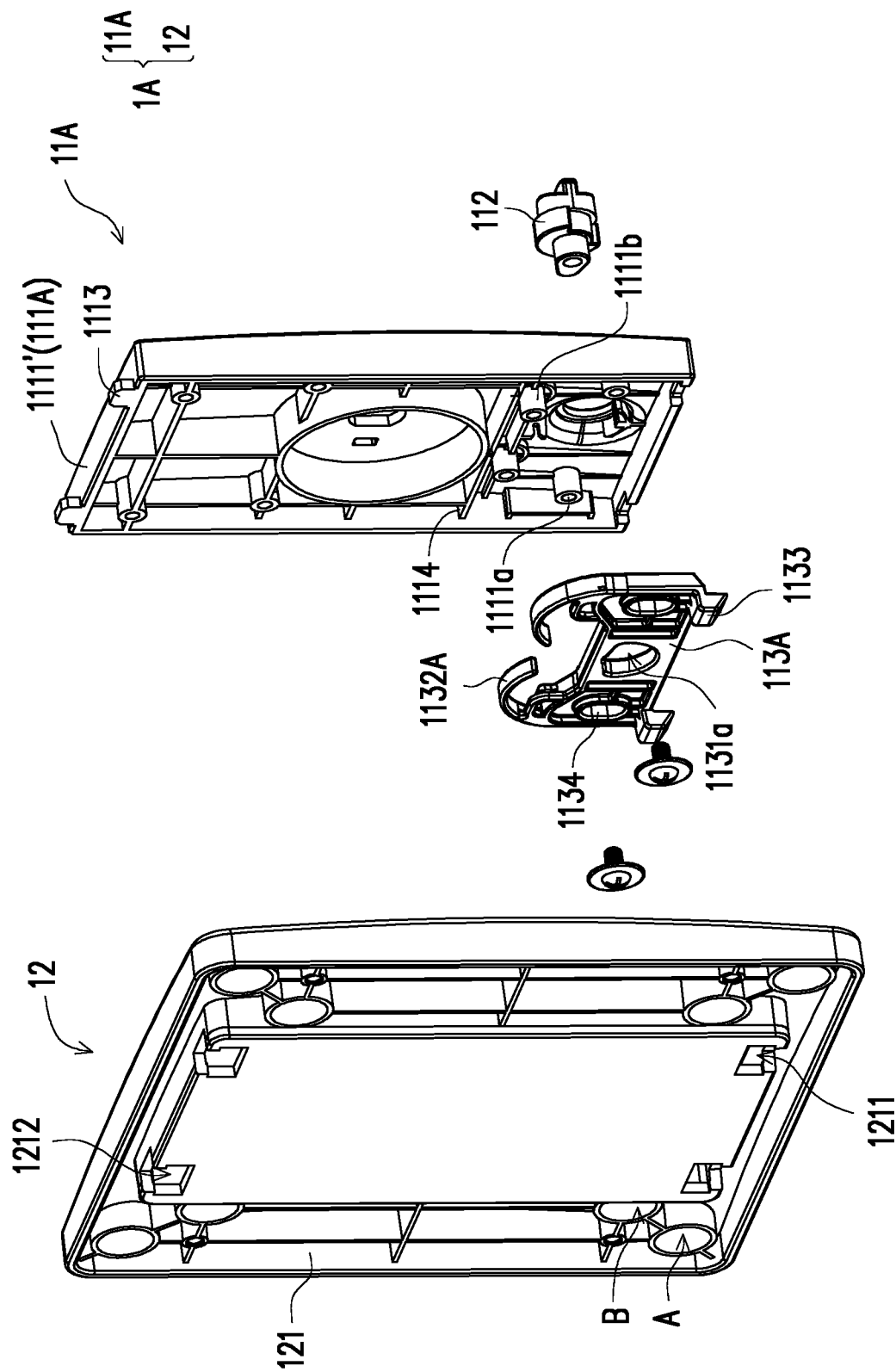
FIG. 6 is an exploded schematic view of the quick release assembly of the second embodiment.
Figure 7:
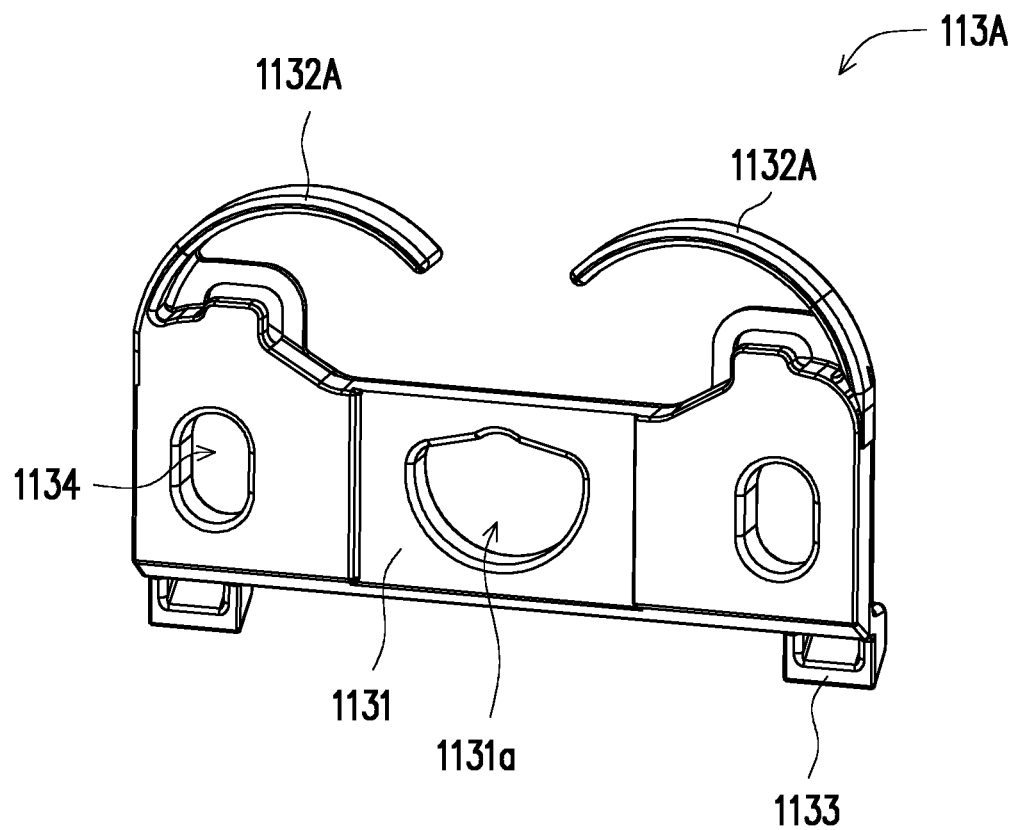
FIG. 7 is a schematic view of the driven-stop plate in FIG. 6.

FIG. 6 is an exploded schematic view of the quick release assembly of the second embodiment, and FIG. 7 is a schematic view of the driven-stop plate in FIG. 6. Please refer to FIG. 6 and FIG. 7 at the same time. In the present embodiment, the first main body 111A only includes the first cover 1111' but does not include the second cover 1112, and the driven-stop plate 113A is screwed to the first ribs 1111a of the first cover 1111' by multiple fasteners (not labelled with reference number).

In addition, the elastic portion 1132A of the driven-stop plate 113A is embodied as elastic sheet extended from the body portion 1131 instead of a spring that is an element separated from the body portion 1131. The elastic portion 1132A embodied as elastic sheet is arranged as a pair and arranged symmetrically. The first cover 1111' has two limiting ribs 1114, and the elastic sheets abuts the limiting ribs 1114 when the driven-stop plate 113 is assembled to the first cover 1111'.

The force exerted from the elastic portion 1132A to the body portion 1131 is more even since the elastic portions 1132A being arranged in pairs.

It can be seen from the above that the quick release assembly 1A of the second embodiment uses fewer parts than the quick release assembly 1 of the first embodiment, and the structure is more concise.

Figure 8A:
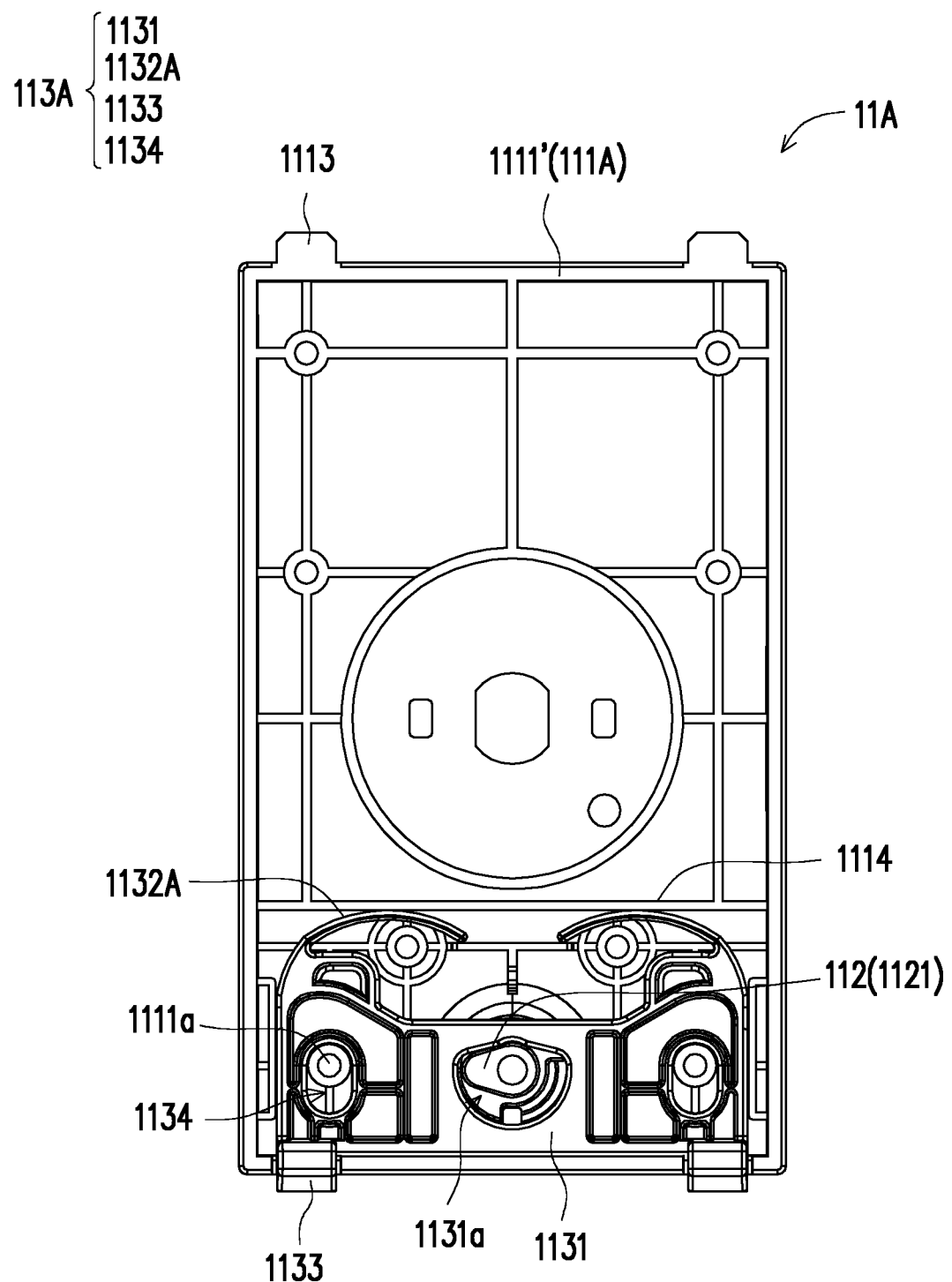
FIG. 8A to FIG. 8C are schematic views of the operation of the quick release assembly of the second embodiment.
Figure 8B:
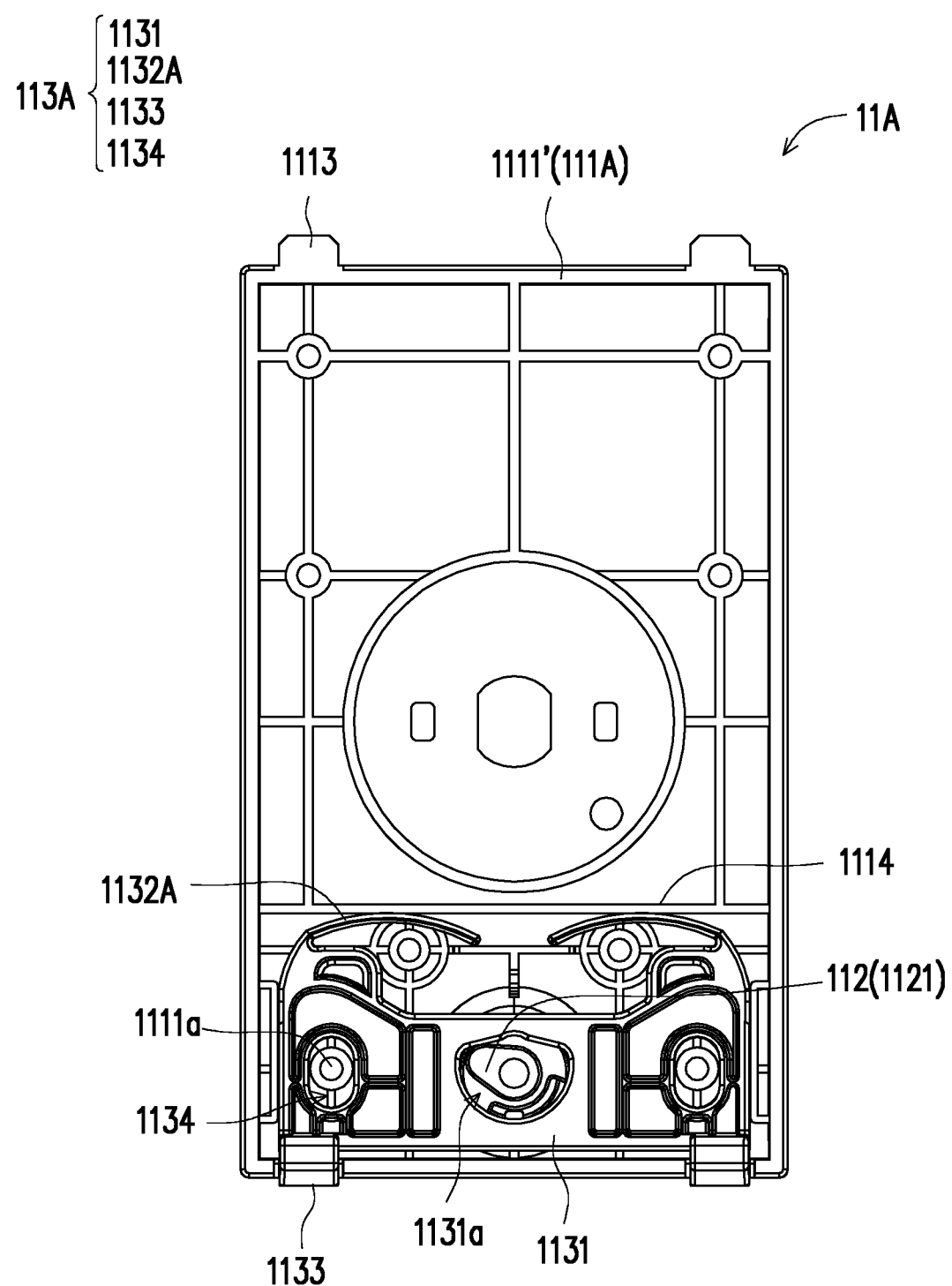
Figure 8C:
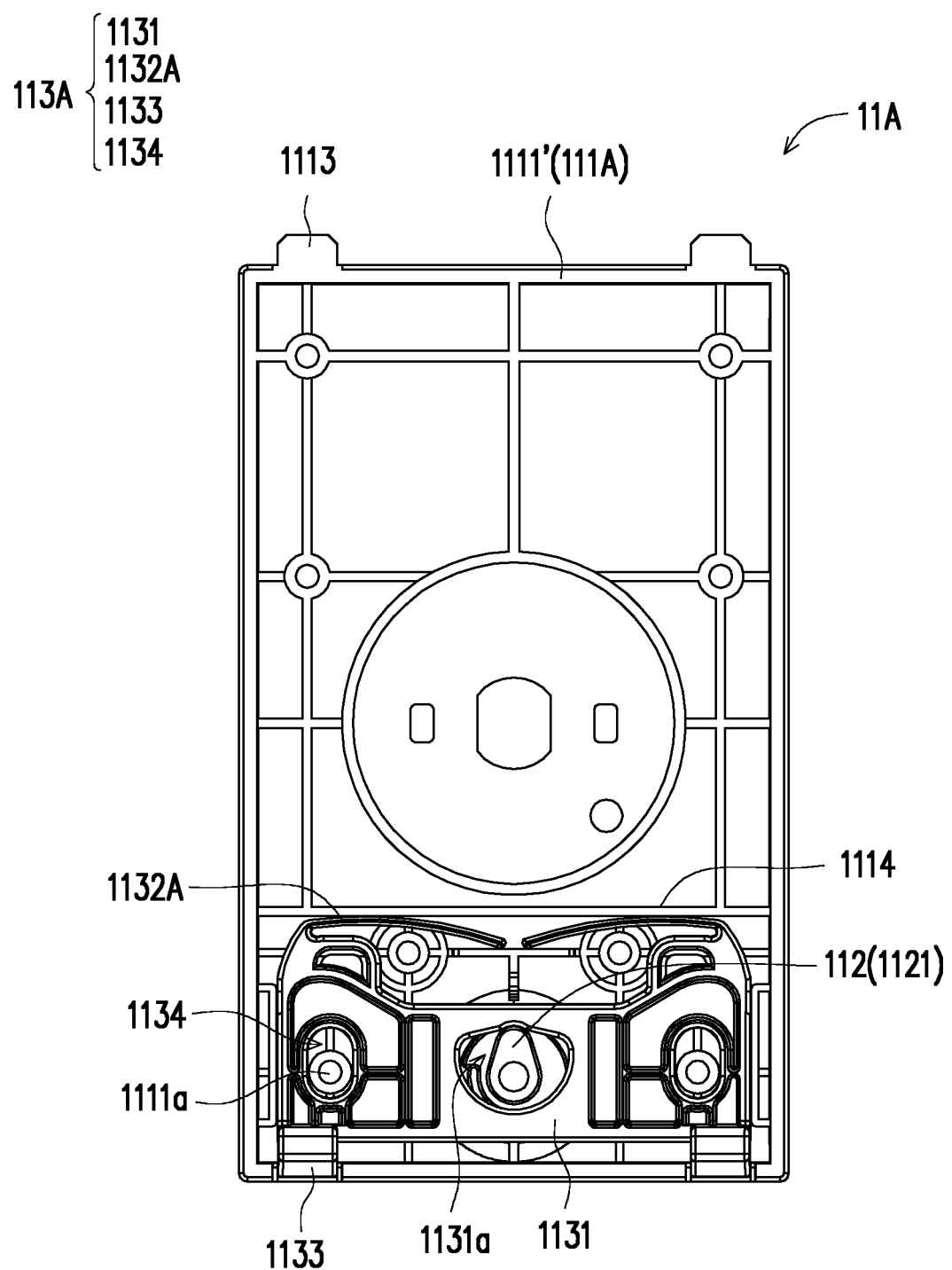

FIG. 8A to FIG. 8C are schematic views of the operation of the quick release assembly of the second embodiment.

Please refer to FIG. 8A, the tip of the cam portion 1121 of the operating element 112 faces the left in the figure when the object 2 is assembled onto the support 3, and the first ribs 1111a are located on the upper edge of the sliding grooves 1134.

As shown in FIG. 8B, by applying an external force to the operating element 112 which is embodied as a knob, the knob rotates clockwise. While the knob is rotating clockwise, the tip of the cam portion 1121 of the operating element 112 rotates to the right, the operating element 112 pushes the driven-stop plate 113A to move linearly upward, the first ribs 1111a are positioned at the bottom edge of the sliding grooves 1134 when the cam portion 1121 of the operating element 112 rotates about 90 degrees, and the elastic sheet deforms to store an elastic restoring force, as shown in FIG. 8C.

Referring to FIG. 6 and FIG. 8C. At this time, the first hooks 1133 of the driven-stop plate 113A are separated from the first conjunctions 1211 of the second main body 121, releasing the engagement of the first quick release unit 11A and the second quick release unit 12. Further, removing the second hooks 1113 from the second conjunctions 1212 makes the second quick release unit 12 completely separate from the first quick release unit 11A, and therefore the object 2 is easily removed from the support 3.

In summary, the quick release assembly and the support using the quick release assembly of the present invention have the advantages of easy to assemble or disassemble, and simple to operate when assembling or disassembling. Furthermore, the quick release assembly is adapted to objects of different sizes or specifications since the quick release assembly has at least one set of attachment holes. Therefore, the support with this quick release assembly is also suitable for being applied to objects of different sizes, specifications or types, which increasing the commonality of the support, effectively reducing development and manufacturing costs, and providing general consumers with convenience when assembling or disassembling.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A quick release assembly for attaching an object to a stand, wherein the quick release assembly comprising:

a first quick release unit, detachably disposed on one of the d and the object, and the first quick release unit includes:
a first main body;
an operating element, assembled on the first main body, wherein a portion of the operating element is exposed outside of the first main body;
a driven-stop plate, arranged in the first main body and linked to the operating element, the driven-stop plate having a body portion, an elastic portion and at least a first hook; and
a second quick release unit, suitable for engaging with the first quick release unit detachably, the second quick release unit comprising:
a second main body, assembled on the other one of the stand and the object detachably, the second main body having at least a first conjunction, and a position of the first conjunction corresponding to a position of the first hook;
wherein, the first hook is engaged into the first conjunction correspondingly to attach the object onto the stand when the first quick release unit and the second quick release unit are engaged with each other,
wherein, the operating element drives the driven-stop plate to move when an external force is applied on the operating element, the first hook is separated from the first conjunction, and thereby enabling the first quick release unit to be separated from the second quick release unit,
wherein the operating element is a knob having a cam portion corresponding to an opening of the body portion of the driven-stop plate, the cam portion has a first inclined plane, the opening has a second inclined plane, and the first inclined plane and the second inclined plane are in contact with each other.

2. The quick release assembly according to claim 1, wherein the second main body further has a recessed space, and the first main body is accommodated in the recessed space when the first quick release unit and the second quick release unit are engaged with each other.

3. The quick release assembly according to claim 2, wherein the second quick release unit further comprises at least a set of fixing members, the second main body further comprises at least a set of attachment holes, and the fixing members are inserted into the attachment holes correspondingly to lock into the object, thereby fixing the second main body to the object, the attachment holes comply with VESA specifications, the object is a display screen, and the object has at least a set of mounting holes corresponding to the attachment holes.

4. The quick release assembly according to claim 3, wherein the number of the elastic portion, the number of the first hook, or the number of the first conjunction are two, and the elastic portions and the first hooks are respectively located on opposite sides of the body portion.

5. The quick release assembly according to claim 3, wherein the elastic portion is an elastic sheet extended from the body portion.

6. The quick release assembly according to claim 3, wherein the elastic portion is a spring disposed on the body portion.

7. The quick release assembly according to claim 3, wherein the first main body includes a first cover and a second cover, and the driven-stop plate is disposed between the first cover and the second cover.

8. The quick release assembly according to claim 7, wherein the body portion of the driven-stop plate has a pair of sliding grooves located on opposite sides of the operating element, and the first cover or the second cover has a pair of first ribs, the first ribs are located in the sliding grooves correspondingly to move along an extending direction of the sliding grooves, the second cover has a pair of second hooks, the second main body has a pair of second conjunctions, and positions of the second hooks corresponds to positions of the second conjunctions.

9. A quick release assembly for attaching an object to a stand, wherein the quick release assembly comprising:
a first quick release unit, detachably disposed on one of the stand and the object, and the first quick release unit includes:
a first main body;
an operating element, assembled on the first main body, wherein a portion of the operating element is exposed outside of the first main body;
a driven-stop plate, arranged in the first main body and linked to the operating element, the driven-stop plate having a body portion, an elastic portion and at least a first hook; and
a second quick release unit, suitable for engaging with the first quick release unit detachably, the second quick release unit comprising:
a second main body, assembled on the other one of the stand and the object detachably, the second main body having at least a first conjunction, and a position of the first conjunction corresponding to a position of the first hook;
wherein, the first hook is engaged into the first conjunction correspondingly to attach the object onto the stand when the first quick release unit and the second quick release unit are engaged with each other,
wherein, the operating element drives the driven-stop plate to move when an external force is applied on the operating element, the first hook is separated from the first conjunction, and thereby enabling the first quick release unit to be separated from the second quick release unit,
wherein the first main body includes a first cover and a second cover, and the driven-stop plate is disposed between the first cover and the second cover, the body portion of the driven-stop plate has a pair of sliding grooves located on opposite sides of the operating element, and the first cover or the second cover has a pair of first ribs, the first ribs are located in the sliding grooves correspondingly to move along an extending direction of the sliding grooves.

10. A support for supporting an object, comprising:
a stand; and
a quick release assembly for attaching the object to the stand, comprising:
a first quick release unit, detachably disposed on one of the stand and the object, and the first quick release unit includes:
a first main body;
an operating element, assembled on the first main body, wherein a portion of the operating element is exposed outside of the first main body;
a driven-stop plate, arranged in the first main body and linked to the operating element, the driven-stop plate having a body portion, an elastic portion and at least a first hook; and
a second quick release unit, suitable for engaging with the first quick release unit detachably, the second quick release unit comprising:

a second main body, assembled on the other one of the stand and the object detachably, the second main body having at least a first conjunction, and a position of the first conjunction corresponding to a position of the first hook;

wherein, the first hook is engaged into the first conjunction correspondingly to attach the object onto the stand when the first quick release unit and the second quick release unit are engaged with each other, wherein, the operating element drives the driven-stop plate to move when an external force is applied on the operating element, the first hook is separated from the first conjunction, and thereby enabling the first quick release unit to be separated from the second quick release unit, wherein the second quick release unit further comprises at least a set of fixing members, the second main body further comprises at least a set of attachment holes, and the fixing members are inserted into the attachment holes correspondingly to lock into the object, thereby fixing the second main body to the object, the attachment holes comply with VESA specifications, the object is a display screen, the object has at least a set of mounting holes corresponding to the attachment holes, and projections of the attachment holes complying with VESA specifications, projected onto a plane where the first quick release unit exists, are out of the first quick release unit.

11. The support according to claim 10, wherein the second main body further has a recessed space, and the first main body is accommodated in the recessed space when the first quick release unit and the second quick release unit are engaged with each other.

12. The support according to claim 10, wherein the operating element is a knob having a cam portion corresponding to an opening of the body portion of the driven-stop plate.

13. The support according to claim 12, wherein the cam portion has a first inclined plane, the opening has a second inclined plane, and the first inclined plane and the second inclined plane are in contact with each other.

14. The support according to claim 10, wherein the elastic portion is an elastic sheet extended from the body portion.

15. The support according to claim 10, wherein the elastic portion is a spring disposed on the body portion.

16. The support according to claim 10, wherein the first main body includes a first cover and a second cover, and the driven-stop plate is disposed between the first cover and the second cover.

17. The support according to claim 16, wherein the body portion of the driven-stop plate has a pair of sliding grooves located on opposite sides of the operating element, and the first cover or the second cover has a pair of first ribs, the first ribs are located in the sliding grooves correspondingly to move along an extending direction of the sliding grooves.

18. The support according to claim 16, wherein the second cover has a pair of second hooks, the second main body has a pair of second conjunctions, and positions of the second hooks corresponds to positions of the second conjunctions.

* * * * *